March 14, 1933.  D. E. ZOOK  1,901,687
MACHINE FOR MEASURING BODY VOLUME
Filed April 25, 1931
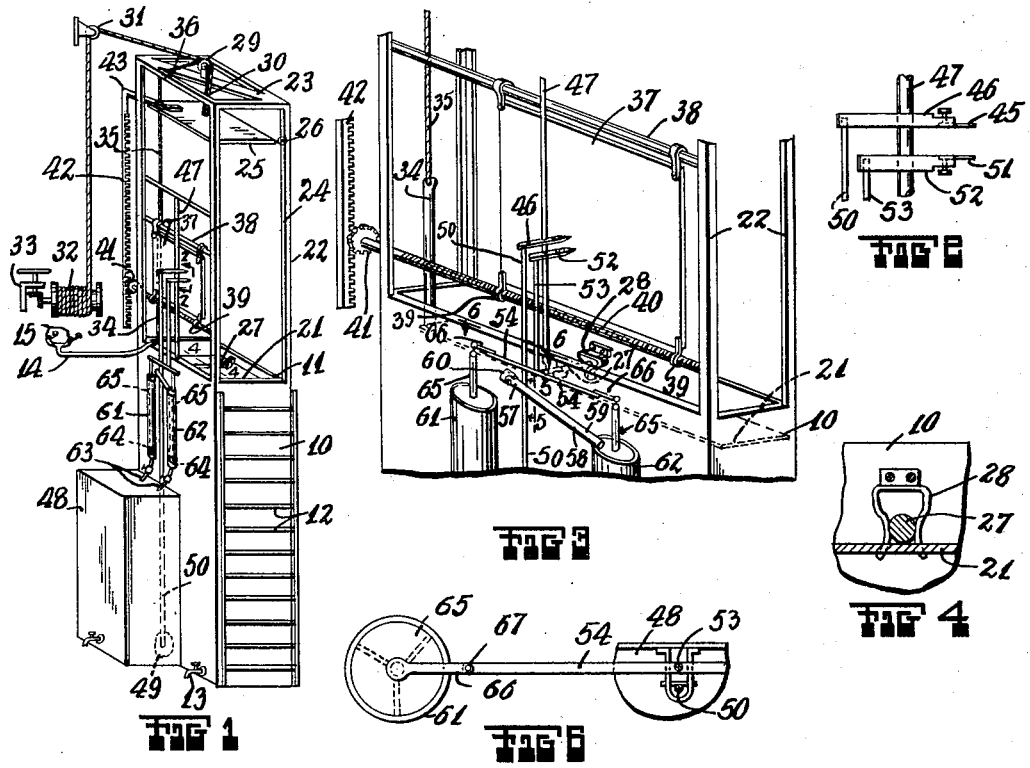
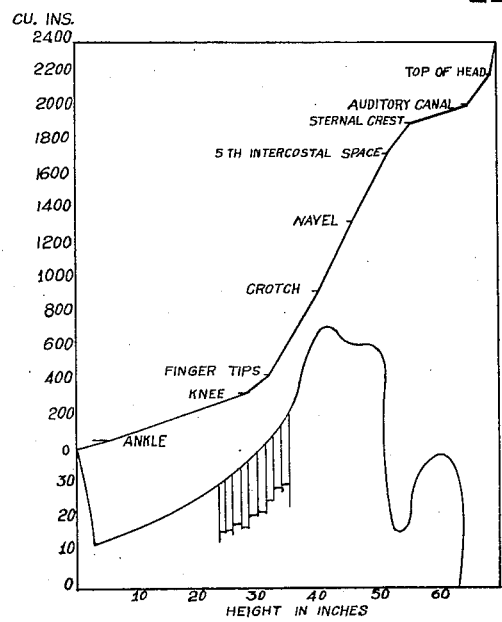
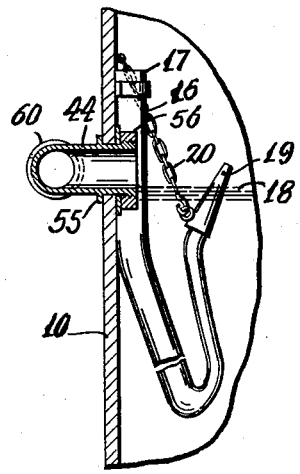
INVENTOR
Dott E. Zook
BY
ATTORNEY Patented Mar. 14, 1933

1,901,687

UNITED STATES PATENT OFFICE

DOTT E. ZOOK, OF CHICAGO, ILLINOIS

MACHINE FOR MEASURING BODY VOLUME

Application filed April 25, 1931. Serial No. 532,833.

This invention relates to new and useful improvements in a machine for measuring body volume by water displacement.

The purpose of this machine is to obtain a record of the exact volume of each part or segment of the body. By obtaining this record at intervals of a year, we can determine how much each segment and the body as a whole increases in volume or grows. As the body is a solid, its growth must be determined by its increasing volume.

This machine enables one to locate and determine the exact amount of any increase or decrease in body volume. It gives a detailed and exact method of studying body growth. It enables one to determine the specific gravity of the body as a whole, both when the lungs are fully inflated and when deflated.

The invention has for another object the provision of a machine for measuring body volume by water displacement which is characterized by a tank for holding water, a platform for a person to stand on and be lowered into the tank, means for lowering the platform into the tank, and means for measuring and recording the water displaced by the person on the platform in relation to the depth of submersion.

The invention has for a still further object the arrangement of a frame on the top of the tank, and a carriage for holding the platform slidably mounted within the frame.

A still further object of this invention is to provide a hoist which is preferably manually controlled and which has a cable arranged for lowering and raising said platform.

Another object of this invention is to arrange a means for controlling the temperature of the water in the tank so that it does not cause discomfort to a person being measured. Preferably, this means consists in initially filling the tank with a mixture of hot and cold water so as to obtain a temperature of approximately 98° F., body heat.

As a further object of this invention it is proposed to arrange a board for holding graph paper to receive the record of the subject, and to provide a means for moving the board sidewards in proportion to the submerging and to provide a means for moving a pencil vertically across the board in proportion to the volume of water displaced.

The provision of a means for compensating the carriage displacement of water is also proposed.

A still further object of this invention is to mount a rack upon the platform and to cause the rack to turn a gear connected with its screw having followers connected with the board for accomplishing the lateral movement of the board in proportion to the submerging position of the platform.

As another object it is proposed to arrange an overflow pipe from the tank to discharge into a vessel and to arrange a means for moving the pencil vertically across the board in proportion to the height of the liquid within said vessel.

Another purpose of this invention is to arrange a rod or other mass which is normally emerged in the water of the tank and arranged to be drawn out in proportion to the lowering of the platform to constitute the means for compensating the carriage displacement.

A still further object of the invention is to arrange a pair of vessels upon the outside of the tank to initially receive the overflow from the tank so that various other measurements may be made in addition to obtaining a cumulative record of the subject's volume.

And a still further object of this invention is to provide a machine for measuring body volume by water displacement which is of simple durable construction, dependable in use and efficient in action, and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a perspective view of a device constructed according to this invention.

Fig. 2 is a fragmentary elevational view looking in the direction of the line 2—2 of Fig. 1.

Fig. 3 is a fragmentary enlarged detailed view of a portion of Fig. 1.

Fig. 4 is a fragmentary vertical sectional view taken on the line 4—4 of Fig. 1.

Fig. 5 is a fragmentary enlarged vertical sectional view taken on the line 5—5 of Fig. 3.

Fig. 6 is a fragmentary horizontal sectional view taken on the line 6—6 of Fig. 3.

Fig. 7 is the graph of the record of a subject taken on the device.

The device comprises a tank 10 for holding a liquid. This tank is shown of rectangular form in horizontal cross section and opened at the top 11. A ladder 12 is arranged upon one side of the tank so that the subject may mount it to reach the top of the tank. A drain 13 at the bottom of the tank is for the purpose of draining out the tank when desired. The tank may be filled with a liquid, preferably water, by a hose 14 connecting with a combination water faucet 15 having hot and cold water pipes individually controlled by valves. A breathing pipe 16 is attached within the tank, so that one end 17 extends above the normal water line 18 in the tank and the other end has a mouth piece 19 for the subject to take it in his mouth during measurements in which the head is completely submerged.

A chain 20 is shown normally holding the tip of the mouth piece above the surface of the water so that it may be disconnected for engagement in one's mouth at the proper time. It should be noticed that since but a small portion of the tip projects above the water line while the major portion is beneath the water line, the discrepancy of measurement will be but very slight. If greater accuracy is wanted, even the tip of the mouth piece could normally be in the water and when taken into the subject's mouth he may blow the pipe clear from water.

A platform 21 for a person to stand on is slidably supported over the tank 10. A frame 22 is mounted upon the top of the tank and preferably is formed of angle irons vertically extending upwards from the four corners of the tank. This frame has a top member 23. The platform 21 is attached upon a carriage 24 slidably mounted within the frame 22. This carriage consists of several vertical bars connected with a top member 25. Rollers 26 are arranged upon the carriage 24 and engage within the angle irons of the frame so as to prohibit lateral movements of the carriage and restrict all motions to the vertical.

A crotch rod 27 is arranged transversely across the top of the tank on the water line. This crotch rod is supported at its ends by spring clips 28 attached upon the inner sides of the tank. It is intended that the subject stand with the feet on opposite sides of the crotch rod and as the platform is lowered a sufficient distance for the crotch to press the rod free from its position, this will indicate that the subject's crotch is at the water line. The spring clips 28 preferably should be designed so that the rod 27 is moved out of place upon a two pound pressure.

A means is provided for lowering the platform 21 into the tank 10. This means is in the form of a pulley 29 mounted upon the top member 23 of the frame 22 and holding a cable 30 which is connected on the top member 25 of the carriage 24. This cable is shown extended over an idler pulley 31 attached upon some stationary part and then continues and connects with the drum 32 of a hoist 33. Preferably, this hoist should be manually controllable so as to raise and lower the platform as desired and hold the platform in various intermediate positions. The details of this hoist will not be given in this specification, since it forms no part of this invention and its design is generally known to those skilled in the art.

A means is provided for compensating for the displaced water due to the lowering of the platform 21. This means is in the form of a rod 34 normally submerged in the tank and connected with a means to raise the rod in proportion to the lowering of the platform. This latter means is in the form of a cable 35 attached upon the rod and extended over an idler 36 mounted upon the member 23 of the frame. The cable then connects the cable 30 of the hoist in a manner so that when the platform is lowered, the rod 34 is raised. The rod 34 should be of proper size and shape so as to completely counteract the lowering of the platform and carriage into the water.

A means for measuring and recording the water displaced by a person standing on the platform 21 as it is lowered in relation to the depth of submersion has a board 37 to hold a sheet of paper upon which the record is scribed. A sheet of graph paper may be used and tacked upon the board 37 for receiving the record. A means is provided for moving the board 37 laterally in proportion to the downward motion of the platform 21. A frame 38 serves to slidably support the board 37 for lateral movements. This frame has followers 39 which threadedly engage a screw 40 rotatively mounted in the frame 38 and carrying a pinion 41. A rack 42 meshes with the pinion 41 and is supported by a finger 43 attached upon the top member 25 of the carriage.

A water overflow is arranged within the tank 10 and comprises an overflow pipe 44 at the normal water line 18 of the tank. A pencil 45 is longitudinally movable across the board 37. This pencil is mounted within a pencil holder 46 which is slidably arranged upon a rod 47 supported on the frame 22 and extending across the board 37. A means is also provided for moving the pencil 45 in proportion to the cumulative overflow of the tank 10. This means is in the form of a vessel 48 which accumulates all of the overflow water. A float 49 within this vessel is connected with a rod 50 slidably mounted and connected with the pencil holder 46. Preferably, the rod 50 should be counterbalanced so that it may be efficiently moved by the float.

A second pencil 51 is also provided which is supported by a pencil holder 52 slidably arranged upon the guide rod 47. A rod 53 connects with the pencil holder 52 and terminates at its lower end in a transverse branch 54. The pipe 44 is swivelly mounted by reason of having a flange 55 engaging against the outer face of the tank 10 and a collar 56 attached upon the inner end of the pipe. The pipe 44 has oppositely directed branches 57 and 58. Pins 59 project from the ends of the branches and are engageable in a bayonet slot of a cap 60 which is used to close one or the other branch. Vessels 61 and 62 are attached upon the tank 10 in positions so that when the branch 58 is tilted in one direction it will discharge the overflow in one of the vessels, and when tilted in the other direction into the other vessel.

Drains 63 are arranged in the bottoms of each of the vessels 61 and 62 and are so constructed as to discharge into the vessel 48. Floats 64 within the vessels 61 and 62 connect with rods 65 which terminate beneath the transverse member 54 of the pencil rod 53. The ends 66 of the transverse member 54 are separate from the remaining portion and pivotally connect therewith at 67 so as to be capable of frictionally holding various positions.

The operation of the device is as follows. Assume the tank filled with water up to the overflow line. Assume the drain 63 opened so that all water discharges into the vessel 48. Now then, a subject stands upon the platform 21 so that the feet straddle the crotch bar 27. Then the hoist 33 is operated so as to slightly lower the subject.

Before the subject enters upon the platform 10, it is advisable that various segments be marked off for convenience in subsequent measurements, that is, for example, the operator locate the true ankle joint of the subject and place an ink mark upon the skin at this point. Other segments may be located, such as at 5th intercostal space, the sternal crest, the auditory channel, the bottom of the sturnum and top of the sturnum.

The hoist is manipulated so that the platform 21 assumes a position where the first mark on the person reaches the water line, for example the ankle. As the platform was lowered the motion will have been transmitted by the rack 42 to cause the board 37 to move slightly laterally. As the platform was lowered, also overflow took place and discharge within the vessel 48 causing the float 47 to rise and the pencil 45 to record upon the sheet of the board. Next the hoist should be operated so as to slightly raise the platform causing the board 37 to move slightly backwards and the pencil 45 to scribe a slight horizontal line indicating the point of measurement.

Then the hoist is again manipulated to lower the platform until the second mark is reached, and this is continued until a complete graph is obtained of the subject. It should be noticed that when the crotch point is reached, the bar 27 will be freed so as to indicate to the operator that this point is in recording position.

After the subject has been lowered to the mouth into the water, the lung capacity may be recorded by reason of the subject taking the mouth piece in the mouth and fully exhaling. Then the lowering can be continued for concluding the recording of the person's cranium and finally the subject may inhale, and this last operation will give the lung capacity.

The top graph shown in Fig. 7 is known as a cumulative graph, since it adds the volume of the various segments measured. It may be made at the same time that other graphs are made, by reason of using the vessels 61 and 62 as hereinafter further described, but it is generally best that it be made only one at a time since it requires but eight minutes or less for its completion while the other graphs may take a considerably longer period. When made alone, the subject is stopped only on the division points between the segments, that is, the ankle, the knee, etc. The valves at the bottom of the vessels 61 and 62 are open so that the overflow discharges directly into the vessel 48. The cross section of the vessel 48 may be, for example, 200 square inches, then the float 49 causes the pin to rise one inch for each 200 cubic inches of water discharged into the tank. When the subject has been lowered to any division point and the water has stopped overflowing, the subject should be raised slightly so that the horizontal mark before referred to is made upon the graph, indicating the division point. The length of any segment is found by taking the horizontal distance between all division points in the scale at the bottom for height. The volume of any segment is found by taking the vertical distance between two division points in the scale at the left for volume.

The vessels 61 and 62 may be used for making various other graphs, for example may be used to make individual graphs of certain segments of the subject. This can be done by first tilting the tube 44 so that the water discharges into one of the vessels causing the recording with the pencil 51 and then the tube may be tilted so as to discharge into the other of the vessels while the first vessel may discharge its contents into the vessel 48. The portions 66 of the bar 54 may be moved out of the path of motion of the rods 65 whenever desired so that one of the rods will not interfere with the operation of the other rod to record any segment.

A very interesting graph is one which I generally call the profile graph, since it very closely resembles the profile of the subject. This graph is the one illustrated at the bottom in Fig. 7. It is secured by lowering the subject one inch at a time. The water displaced when the subject is lowered the first inch is discharged into one of the vessels (61 or 62) causing the float to raise the lower vessel 61 along the vertical coordinate one-fifth of an inch from the left edge of the graph. The cross section of the tubes 61 and 62 may be 10 square inches so that the pencil will be raised one inch for 10 cubic inches of water displaced into the tube. The total number of cubic inches indicated at any point is the cross section area of the body at that point. The overflow is alternated between the tubes 61 and 62 as the measurement continues. The way in which the pencil moves up and down as the overflow alternates is illustrated near the center of the graph. When the pencil reaches the highest point and the overflow is changed, the pencil moves down but does not reach the bottom as it is caught by the float in the other tube which is being filled. The profile graph has little practical value and requires nearly one hour for its completion. It is given here only to show in how great detail the machine is able to record volume. The cross section area of the body which may be read directly from this graph may be secured from the cumulative graph, which is the one shown at the top. This is done by measuring the vertical distance between two points which are one inch apart on the horizontal.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A machine for measuring body volume by water displacement, comprising a tank for holding a liquid, a platform for a person to stand on slidably supported over said tank, means for lowering said platform into said tank, means for compensating for the displaced water due to lowering said platform, and means for measuring and recording water displaced by a person standing on said platform as it is lowered in relation to the depth of submersion.

2. A machine for measuring body volume by water displacement, comprising a tank for holding a liquid, a platform for a person to stand on slidably supported over said tank, means for lowering said platform into said tank, means for compensating for the displaced water due to lowering said platform, and means for measuring and recording water displaced by a person standing on said platform as it is lowered in relation to the depth of submersion, a frame-work being mounted upon said tank and said platform being connected on a carriage within said frame-work.

3. A machine for measuring body volume by water displacement, comprising a tank for holding a liquid, a platform for a person to stand on slidably supported over said tank, means for lowering said platform into said tank, means for compensating for the displaced water due to lowering said platform, and means for measuring and recording water displaced by a person standing on said platform as it is lowered in relation to the depth of submersion, said platform being connected with vertical rods connecting with a top member, and said means for lowering being connected with said top member.

4. A machine for measuring body volume by water displacement, comprising a tank for holding a liquid, a platform for a person to stand on slidably supported over said tank, means for lowering said platform into said tank, means for compensating for the displaced water due to lowering said platform, and means for measuring and recording water displaced by a person standing on said platform as it is lowered in relation to the depth of submersion, said means for compensating for the displaced water comprising a member normally submerged in said tank, and means for moving said member out of said tank in proportion to the submerging of the platform.

5. A machine for measuring body volume by water displacement, comprising a tank for holding a liquid, a platform for a person to stand on slidably supported over said tank, means for lowering said platform into said tank, means for compensating for the displaced water due to lowering said platform, and means for measuring and recording water displaced by a person standing on said platform as it is lowered in relation to the depth of submersion, said means for compensating for the displaced water comprising a member normally submerged in said tank, and means for moving said member out of said tank in proportion to the submerging of the platform, comprising a cable connected with said member and extended over a pulley and finally connected with a cable for lowering said platform.

In testimony whereof I have affixed my signature.

DOTT E. ZOOK.